(12) United States Patent
Clinger et al.

(10) Patent No.: US 8,361,534 B2
(45) Date of Patent: Jan. 29, 2013

(54) STABLE NUTRITIONAL POWDER

(75) Inventors: Christine L. Clinger, New Albany, OH (US); Jeffrey M. Boff, Dublin, OH (US); Paul W. Johns, Columbus, OH (US); Gary E. Katz, Columbus, OH (US); Marti S. Bergana, Blacklick, OH (US)

(73) Assignee: Abbott Laboratories, Abbott Park, IL (US)

( * ) Notice: Subject to any disclaimer, the term of this patent is extended or adjusted under 35 U.S.C. 154(b) by 680 days.

(21) Appl. No.: 12/260,062

(22) Filed: Oct. 28, 2008

(65) Prior Publication Data

US 2009/0162521 A1 Jun. 25, 2009

Related U.S. Application Data

(60) Provisional application No. 61/015,312, filed on Dec. 20, 2007.

(51) Int. Cl.
*A23J 1/02* (2006.01)

(52) U.S. Cl. ............................ 426/656; 426/72; 426/658

(58) Field of Classification Search .................. 426/656
See application file for complete search history.

(56) References Cited

U.S. PATENT DOCUMENTS

| | | | | |
|---|---|---|---|---|
| 4,830,861 A | * | 5/1989 | Puski et al. | 426/18 |
| 5,013,569 A | * | 5/1991 | Rubin | 426/585 |
| 5,021,245 A | | 6/1991 | Borschel et al. | |
| 6,136,858 A | | 10/2000 | Kuchan et al. | |
| 6,156,368 A | * | 12/2000 | Hayasawa et al. | 426/580 |
| 6,306,908 B1 | | 10/2001 | Carlson et al. | |
| 6,365,218 B1 | * | 4/2002 | Borschel et al. | 426/573 |
| 6,589,576 B2 | | 7/2003 | Borschel et al. | |
| 6,733,770 B1 | | 5/2004 | Garcia-Rodenas et al. | |
| 7,247,320 B2 | | 7/2007 | Jost | |
| 2003/0008810 A1 | | 1/2003 | Portman | |
| 2005/0208179 A1 | | 9/2005 | Albrecht et al. | |
| 2007/0281054 A1 | * | 12/2007 | Boff et al. | 426/72 |

FOREIGN PATENT DOCUMENTS

| EP | 1841330 B1 | 2/2011 |
|---|---|---|
| WO | 2004047566 A1 | 6/2004 |

OTHER PUBLICATIONS

Trocki: Intact Protein Versus Free Amino Acids in the Nutritional Support of Thermally Injured Animals; JPEN J Parenter Enteral Nutr 1986 10: 139.*
International Search Report and Written Opinion from PCT/US2008/081596, dated Jul. 22, 2010.
Adler-Nissen, Jens, J. Agr. Food Chem., 1979, vol. 27, No. 6, pp. 1256-1262.
Saito, H., and Nakamura, K., Nippon Suisan Gakkaishi, 1989, pp. 1663, vol. 55, No. 9.
International Search Report from PCT/US2008/081534, dated Jul. 27, 2009.
Examination Report from New Zealand Patent Application No. 585574, dated Feb. 8, 2011.
International Preliminary Report on Patentability for PCT/US2008/081534, dated Jun. 22, 2010.
Office action from U.S. Appl. No. 12/260,320, dated Jul. 21, 2011.
Examination Report from New Zealand Application No. 585619, dated Jun. 10, 2011.
Office action from Russian patent application No. 2010129985, dated Nov. 22, 2011.
Office action from Russian patent application No. 2010129984, dated Nov. 23, 2011.
Written Opinion for Singapore Patent Application No. 201003800-8, dated Aug. 25, 2011.
Written Opinion for Singapore Patent Application No. 201003802-4, dated Aug. 25, 2011.
European Examination Report for EP 08869051.6 dated Nov. 14, 2011.
Final Office action for U.S. Appl. No. 12/260,320 dated Dec. 6, 2011.
2nd Examination Report for New Zealand Application No. 585574 dated Apr. 27, 2012.
2nd Examination Report for European Application No. 08869051.6 dated May 9, 2012.
Non-Final Office action for U.S. Appl. No. 12/260,320 dated Jun. 5, 2012.
First Examination Report from Indian Application No. 1362/MUMNP/2010, dated Jun. 1, 2012.
First Examination Report from Indian Application No. 1359/MUMNP/2010, dated May 17, 2012.
First Office action from Chinese Application No. 200880121601.0, dated Apr. 26, 2012.
Second Written Opinion from Singapore Application No. 201003802-4, dated May 3, 2012.
Second Written Opinion from Singapore Application No. 201003800-8, dated May 3, 2012.

* cited by examiner

*Primary Examiner* — Humera Sheikh
*Assistant Examiner* — Patricia George
(74) *Attorney, Agent, or Firm* — Mark R. Engle; Milan Jovanovic; Sandra E. Weida

(57) ABSTRACT

Disclosed are compositions comprising carbohydrate; lipid, comprising from about 0.25% to about 2.5% lecithin by weight of total lipid; from about 0.5% to about 10% hydrolyzed casein protein by weight of total protein; and from about 90% to about 99.5% intact protein by weight of total protein; wherein the compositions are nutritional powders. The nutritional powders provide improved oxidative stability and sensory performance.

20 Claims, No Drawings

STABLE NUTRITIONAL POWDER

This application claims the benefit of U.S. Provisional Application No. 61/015,312 filed Dec. 20, 2007

TECHNICAL FIELD

The present invention is directed to nutritional powders having improved oxidative stability and sensory performance.

BACKGROUND OF THE INVENTION

Nutritional powders are well known for use in providing various individuals with sole or supplemental nutrition. These powders are reconstituted with water or other aqueous liquid by the ultimate user to form a nutritional liquid or beverage. These powders most often contain varying amounts and types of proteins, carbohydrates, lipids, vitamins, and minerals, all depending largely upon the nutritional needs of the intended user.

Among nutritional formulas commercially available today, infant formulas have become well known and commonly used in providing a supplemental or sole source of nutrition early in life. Although human milk is generally accepted as a superior nutritional source for infants, many infant nutritional formulas can still provide a quality alternative for those mothers who cannot breastfeed or choose not to under their particular circumstances. These infant formulas typically contain proteins, carbohydrates, lipids, vitamins, minerals, and other nutrients.

Nutritional powders, including infant formulas, often contain a variety of ingredients that tend to be more oxidatively sensitive than other ingredients, such as polyunsaturated fatty acids. These fatty acids require additional care during processing to ensure that the polyunsaturated fatty acids, such as docosahexaenoic acid and arachidonic acid, in the finished powder do not excessively degrade by way of oxidation during prolonged storage periods of up to about 36 months.

A novel nutritional powder having improved oxidative stability and sensory performance would be useful.

SUMMARY OF THE INVENTION

One embodiment of the invention is directed to nutritional powders, including powder infant formulas, comprising carbohydrate; lipid, comprising from about 0.25% to about 2.5% lecithin by weight of total lipid; from about 0.5% to about 10% hydrolyzed casein protein by weight of total protein; and from about 90% to about 99.5% intact protein by weight of total protein.

It has been found, surprisingly, that the nutritional powder embodiments of the present invention have improved oxidative stability and sensory performance. It has been found that select levels of hydrolyzed casein protein in combination with lecithin provide a synergistic antioxidant effect, and can therefore be formulated into nutritional powders to reduce oxidation and provide better sensory performance over prolonged periods.

DETAILED DESCRIPTION OF THE INVENTION

The various nutritional powder embodiments described herein, including powder infant formulas and other oxidatively sensitive nutritional powders, comprise carbohydrate, lipid, protein, and select levels of hydrolyzed casein protein and lecithin. These and other essential or optional elements of the nutritional powders are described in detail hereinafter.

The term "lipid" as used herein, unless otherwise specified, means any element of the nutritional powder formula soluble in an organic solvent, including fats, oils, and combinations thereof.

The term "total lipid" as used herein, unless otherwise specified, refers to the lipid component of the nutritional powder embodiments herein.

The term "infant" as used herein, unless otherwise specified, refers to children not more than about one year of age, and includes infants from 0 to about 4 months of age, infants from about 4 to about 8 months of age, infants from about 8 to about 12 months of age, low birth weight infants of less than 2,500 grams at birth, and premature infants born at less than about 37 weeks gestational age, typically from about 26 weeks to about 34 weeks gestational age. The term "child" and "children" as used herein refers to children not more than 12 years of age, and includes children from about 12 months to about 12 years of age. The term "adult" as used herein refers to adults about 12 years and older.

The term "nutritional formula" as used herein, unless otherwise specified, refers to a nutritional composition designed for infants, toddlers, children, adults, or combinations thereof, which may contain sufficient protein, carbohydrate, lipid, vitamins, minerals, and electrolytes to potentially serve as the sole source of nutrition when provided in sufficient quantity. These "nutritional formulas" can also be formulated to provide, or otherwise be used as, a secondary or minor nutritional supplement providing one or more of protein, carbohydrate, lipid, vitamins and minerals.

The term "nutritional powder" as used herein, unless otherwise specified, refers to flowable or substantially flowable particulate nutritional formulas, or at least particulate nutritional formulas that can be easily scooped with a spoon or similar other device, wherein the compositions may be reconstituted with a suitable fluid, typically water, to form a liquid nutritional composition for use in the desired targeted group, e.g., adults, pediatrics including infants, children, toddlers, diabetics, critical care patients, or non-humans such as livestock, pets, and wildlife.

The term "infant formula" as used herein, unless otherwise specified, refers to a nutritional formula designed for infants, which may contain sufficient protein, carbohydrate, lipid, vitamins, minerals, and electrolytes to potentially serve as the sole source of nutrition when provided in sufficient quantity.

The terms "polyunsaturated fatty acid" or "PUFA" as used herein, unless otherwise specified, refer to any polyunsaturated fatty acid or source thereof, including short chain (less than about 6 carbon atoms per chain); medium chain (from about 6 to about 18 carbon atoms per chain); and long chain (having at least about 20 carbon atoms per chain) fatty acids having two or more carbon:carbon double bonds, including ω-3 and ω-6 polyunsaturated fatty acids.

The term "total formula solids" as used herein, unless otherwise specified, refers to the sum concentration or total amount of all ingredients in the nutritional formula, less water.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the embodiments described herein shall include the corresponding plural characteristic or limitation, and vice versa, unless otherwise specified or clearly implied to the contrary by the context in which the reference is made.

All combinations of method or process steps as used herein may be performed in any order, unless otherwise specified or clearly implied to the contrary by the context in which the referenced combination is made.

The embodiments herein may also be substantially free of any optional or selected essential ingredient or feature described herein, provided that the remaining formula still contains all of the required ingredients or features as described herein. In this context, and unless otherwise specified, the term "substantially free" means that the selected composition contains less than a functional amount of the optional or selected ingredient, typically less than 0.1% by weight, and also including zero percent by weight of such optional or selected ingredient.

The embodiments described herein may comprise, consist of, or consist essentially of the essential elements and limitations of the invention described herein, as well as any additional or optional ingredients, components, or limitations described herein or otherwise useful in nutritional powder formula applications.

Hydrolyzed Casein Protein

The various embodiments described herein may comprise from about 0.5% to about 10% hydrolyzed casein protein by weight of total protein, including from about 0.5% to about 5%, and also including from about 0.8% to about 3% by weight of total protein.

The terms "hydrolysate" or "hydrolyzed protein" are used interchangeably herein and unless otherwise specified, refer to protein that has been hydrolyzed or broken down into shorter peptide fragments and/or amino acids. In the broadest sense, a protein has been hydrolyzed when one or more peptide bonds have been broken. Breaking of peptide bonds may occur unintentionally or incidentally during manufacture, for example, incidentally due to heating or shear. For purposes of the nutritional powder embodiments herein, the terms "hydrolysate" or "hydrolyzed protein" mean a protein that has been processed or treated in a manner intended to break peptide bonds. Intentional hydrolysis may be carried out, for example, by treating an intact protein with enzymes, acids, bases, or combinations thereof. The hydrolyzed proteins for use herein are typically prepared by enzyme hydrolysis.

The hydrolyzed proteins for use herein are substantially free of intact protein. In this context, the hydrolyzed casein proteins herein contain less than 1.0% by weight of intact protein, including less than 0.5%, and also including zero percent by weight of intact protein. As such, a single protein ingredient/commodity is not a source of both intact protein and hydrolyzed protein; rather, a single protein ingredient/commodity is either a hydrolyzed protein or an intact protein.

The hydrolyzed proteins for use herein have a degree of hydrolysis of from 5% to about 90%, including from about 8% to about 90%, also including from about 23% to about 80%, and also including from about 45% to about 80%.

Degree of hydrolysis is the extent to which peptide bonds are broken by an intentional hydrolysis method.

For the purposes of this invention, the degree of hydrolysis of a protein source is determined by the Tri-nitrobenzenesulphonic acid (TNBS) procedure. The TNBS procedure is an accurate and reproducible procedure for determining the degree of hydrolysis of a food protein source. The protein hydrolysate is dissolved/dispersed in hot 1% sodium dodecyl sulphate to a concentration of $0.25\text{-}2.5\times10^{-3}$ amino equivalents/liter A sample solution (0.25 milliliters) is mixed with 2 milliliters of 0.2125 M sodium phosphate buffer (pH 8.2) and 2 milliliters of 0.1% trinitrobenzenesulphonic acid, followed by incubation in the dark for 60 minutes at 50° C. The reaction is quenched by adding 4 milliliters of 0.100 N HCl. The absorbance is then read at 340 nanometers. A 1.5 mM L-leucine solution is used as the standard. Transformation of the measured leucine amino equivalents to a degree of hydrolysis is carried out by way of a standard curve for each particular protein substrate (Jens Adler-Nissen, J. Agr. Food Chem. vol. 27, no. 6, 1979).

For purposes of this invention, degree of protein hydrolysis is not the same as the amino nitrogen to total nitrogen ratio (AN/TN) of a protein source, in which the amino nitrogen (AN) component is quantified by USP titration methods for determining amino nitrogen content, while the total nitrogen (TN) component is determined by the Tecator Kjeldahl method. When a peptide bond in a protein is broken by enzymatic hydrolysis, one amino group is released for each peptide bond broken, causing an increase in the amino nitrogen. Using the AN/TN method, even non-hydrolyzed protein would contain some exposed amino groups, and thus have an AN/TN ratio of greater than zero.

Casein protein is derived from milk. Casein protein is the main protein in bovine milk, making up approximately 80% of the protein in bovine milk. Casein protein is a highly nutritious protein that contains 21 amino acids. Non-limiting examples of hydrolyzed casein protein for use herein include hydrolyzed acid casein, hydrolyzed calcium caseinate, hydrolyzed magnesium caseinate, hydrolyzed sodium caseinate, any other salt forms thereof, and combinations thereof. The embodiments described herein typically comprise hydrolyzed calcium caseinate and/or hydrolyzed sodium caseinate.

Hydrolyzed casein protein suitable for use herein may be obtained from any known or otherwise suitable nutrition source. Non-limiting examples include hydrolyzed casein protein from DMV International, Delhi, N.Y., USA; and hydrolyzed casein protein from Arla Food Ingredients, Skanderborgvej, Denmark.

Intact Protein

The various embodiments described herein may comprise from about 90% to about 99.5% intact protein by weight of total protein, including from about 95% to about 99.5%, and also including from about 97% to about 99.2% by weight of total protein.

The term "intact protein" as used herein, unless otherwise specified, refers to protein that has not been intentionally processed or treated in a manner intended to break peptide bonds. Intact proteins are non-hydrolyzed proteins that have not been subject to intentional hydrolysis, and so have an unaltered primary structure (i.e. a complete amino acid sequence). Intact proteins have a degree of hydrolysis of zero. As such, the intact proteins for use herein are substantially free of hydrolyzed protein. In this context, the intact proteins for use herein contain less than 1.0% by weight of hydrolyzed protein, including less than 0.5%, and also including zero percent by weight of hydrolyzed protein.

Intact proteins suitable for use herein may be obtained from any known or otherwise suitable nutrition source. Non-limiting examples of suitable intact proteins include soy based, milk based, casein protein, whey protein, rice protein, beef collagen, pea protein, potato protein, and combinations thereof.

The embodiments herein may further comprise free amino acids. However, the nutritional powder embodiments herein typically comprise less than 10% free amino acids by weight of total protein, including from about 0.2% to about 7%, also including from about 0.2% to about 5%, and also including from about 0.2% to about 2% by weight of total protein. The free amino acids may be added, inherent in the hydrolyzed casein protein, or combinations thereof. For the purposes of this invention, added free amino acids that are not inherent in a hydrolyzed protein have a degree of hydrolysis of 100%. Non-limiting examples of suitable protein free amino acids include tryptophan, glutamine, tyrosine, methionine, cysteine, arginine, and combinations thereof. Non-limiting examples of non-protein amino acids suitable for use herein include carnitine and taurine. In some cases, the D-forms of the amino acids are considered as nutritionally equivalent to the L-forms, and isomer mixtures may be used to lower costs.

Lecithin

The various embodiments described herein may comprise from about 0.25% to about 2.5% lecithin by weight of total lipid, including from about 0.25% to about 1.5%, and also including from about 0.3% to about 0.8% by weight of total lipid.

Lecithins are predominantly a mixture of glycerol phospholipids (e.g., phosphatidylcholine, phosphatidylethanolamine and phosphatidylinositol). Phosphotidlylcholine is typically the major gylcerol phospholipid component. Lecithins may also contain other compounds such as free fatty acids, monoglycerides, diglycerides, triglycerides, glycolipids, and other lipid/fatty acid containing compounds. Lecithins are sometimes classified as glycerol phospholipids or phosphotides. This class of compounds has ampliphilic properties and thus emulsifying functionality.

Lecithins are typically added to liquid food products (including nutritional liquids), as emulsifiers, so that the liquid products remain homogeneous and do not separate. Lecithins are approved by the United States Food and Drug Administration for human consumption with the status "Generally Recognized As Safe." Non-limiting examples of lecithins suitable for use herein include egg lecithin, wheat lecithin, corn lecithin, soy lecithin, modified lecithin, and combinations thereof. The embodiments described herein typically comprise soy lecithin.

Lecithins suitable for use herein may be obtained from any known or otherwise suitable nutrition source. Non-limiting examples include soy lecithin from ADM Specialty Food Ingredients, Decatur, Ill., USA; soy lecithin from Solae, LLC, St. Louis, Mo., USA; and soy lecithin from American Lecithin Company, Oxford, Conn., USA.

Nutrients

The nutritional powder embodiments described herein may comprise sufficient types and amounts of nutrients to meet the targeted dietary needs of the intended user. These powder formulas comprise protein, carbohydrate, and a lipid, as described herein. The formulas may further comprise vitamins, minerals, or other ingredients suitable for use in powder nutritional formulas.

The amount of carbohydrate, protein, and lipid in the embodiments herein may vary considerably depending upon the dietary needs of the intended user as well as many other well-known variables. These ingredients, however, are most typically formulated into nutritional powders described herein within the ranges described in the following table.

| Nutrient* | First embodiment | Second embodiment | Third embodiment |
| --- | --- | --- | --- |
| Carbohydrate % total calories | 20-85 | 30-60 | 35-55 |
| Lipid % total calories | 5-70 | 20-60 | 25-50 |
| Protein % total calories | 2-75 | 5-50 | 7-40 |

*each numerical value is preceded by the term "about"

Different sources and types of carbohydrates, lipids, proteins (described hereinbefore), minerals, and vitamins are known and may be used in the embodiments herein, provided that such nutrients are compatible with the added ingredients in the selected formula, are safe for their intended use, and do not otherwise unduly impair product performance.

Carbohydrates suitable for use herein may be simple or complex, lactose-containing or lactose-free, or combinations thereof, non-limiting examples include hydrolyzed, intact, naturally and/or chemically modified starch, maltodextrin, glucose polymers, sucrose, corn syrup, corn syrup solids, rice or potato derived carbohydrate, glucose, fructose, lactose, high fructose corn syrup, indigestible oligosaccharides such as fructooligosaccharides (FOS), and combinations thereof.

Non-limiting examples of lipids suitable for use herein include coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof.

The lipids for use herein may comprise long chain polyunsaturated fatty acids, non-limiting examples of which include docosahexaenoic acid, eicosapentaenoic acid, arachidonic acid, or combinations thereof. These materials are known to provide beneficial effects in infants, such as enhanced brain and vision development. Non-limiting sources of arachidonic acid, eicosapentaenoic acid, and docosahexaenoic acid include marine oil, egg derived oils, fungal oil, algal oil, and combinations thereof.

The embodiments herein may comprise any of a variety of vitamins, non-limiting examples of which include vitamin A, vitamin D, vitamin E, vitamin K, thiamine, riboflavin, pyridoxine, vitamin B12, niacin, folic acid, pantothenic acid, biotin, vitamin C, inositol, choline, salts and derivatives thereof, and combinations thereof.

The embodiments herein may comprise any of a variety of minerals, non-limiting examples of which include calcium, phosphorus, magnesium, iron, zinc, manganese, copper, iodine, sodium, potassium, molybdenum, chloride, selenium, chromium, chloride, salts and derivatives thereof, and combinations thereof.

Optional Ingredients

The embodiments described herein may further comprise other optional ingredients that may modify the physical, chemical, aesthetic, or processing characteristics of the compositions or serve as additional nutritional components when used in the targeted population. Many such optional ingredients are known or otherwise suitable for use in nutritional powders, including powder infant formulas, and may also be used in the nutritional powder embodiments herein, provided that such optional materials are compatible with the essential materials described herein, are safe and effective for their intended use, and do not otherwise unduly impair product performance.

Non-limiting examples of such optional ingredients include preservatives, additional antioxidants, emulsifying agents, buffers, colorants, flavors, vitamins, minerals, nucleotides and nucleosides, probiotics, prebiotics, lactoferrin and related derivatives, thickening agents and stabilizers, and so forth.

Infant Formula Embodiments

The nutritional powder embodiments herein may comprise nutrients in accordance with the relevant guidelines for the targeted consumer or user population, an example of which would be the Infant Formula Act, 21 U.S.C. Section 350(a).

The infant formulas may include those embodiments comprising the carbohydrate, lipid, and protein concentrations described in the following table.

| Infant Formula Macro Nutrients* | | | |
|---|---|---|---|
| Nutrient | Embodiment | g/100 kcal | g/L (reconstituted, as fed) |
| Carbohydrate | $1^{st}$ embodiment | 8-16 | 54-108 |
| | $2^{nd}$ embodiment | 9-13 | 61-88 |
| Lipid | $1^{st}$ embodiment | 3-8 | 20-54 |
| | $2^{nd}$ embodiment | 4-6.6 | 27-45 |
| Protein | $1^{st}$ embodiment | 1-6 | 7-41 |
| | $2^{nd}$ embodiment | 1.5-3.4 | 10-24 |

*all numerical values preceded by the term "about"

The nutritional powders herein include those embodiments that comprise per 100 kcal of formula one or more of the following: vitamin A (from about 250 to about 1250 IU), vitamin D (from about 40 to about 150 IU), vitamin K (at least about 4 mcg), vitamin E (at least about 0.3 IU), vitamin C (at least about 8 mg), thiamine (at least about 8 mcg), vitamin B12 (at least about 0.15 mcg), niacin (at least about 250 mcg), folic acid (at least about 4 mcg), pantothenic acid (at least about 300 mcg), biotin (at least about 1.5 mcg), choline (at least about 7 mg), and inositol (at least about 4 mg).

The nutritional powders herein include those embodiments that comprise per 100 kcal of formula one or more of the following: calcium (at least about 50 mg), phosphorus (at least about 25 mg), magnesium (at least about 6 mg), iron (at least about 0.15 mg), iodine (at least about 5 mcg), zinc (at least about 0.5 mg), copper (at least about 60 mcg), manganese (at least about 5 mcg), sodium (from about 20 to about 60 mg), potassium (from about 80 to about 200 mg), and chloride (from about 55 to about 150 mg).

Product Form

The embodiments herein are typically in the form of flowable or substantially flowable particulate compositions, or at least particulate compositions that may be easily scooped and measured with a spoon or similar other device, wherein the compositions may be reconstituted by the intended user with a suitable aqueous fluid, typically water, to form a liquid nutritional composition for immediate oral or enteral use by the intended user. In this context, "immediate" use means within about 48 hours, including within about 24 hours, and also including right after, reconstitution. The embodiments include spray dried, agglomerated, dry mixed or other known or otherwise effective particulate form. The quantity of nutritional powder required to produce a volume suitable for one serving may vary.

The embodiments herein may be packaged and sealed in single or multi-use containers, and then stored under ambient conditions for up to about 36 months, including from about 12 to about 24 months. For multi-use containers, these packages may be opened and then covered for repeated use by the ultimate user, provided that the covered package is then stored under ambient conditions (e.g., avoid extreme temperatures) and the contents used within about one month or so.

Method of Manufacture

The nutritional powder embodiments may be prepared by any known or otherwise effective technique suitable for making and formulating nutritional powders, variations of which may depend upon variables such as the selected ingredient combination, packaging and container selection, and so forth. Such techniques and variations are described in the nutritional art or are otherwise well known to those skilled in the nutritional art.

The nutritional powder embodiments, including the exemplified formulas described hereinafter, may therefore be prepared by any of a variety of known or otherwise effective formulation or manufacturing methods. These methods typically involve the initial formation of an aqueous slurry containing carbohydrates, proteins, lipids, stabilizers or other formulation aids, vitamins, minerals, or combinations thereof. The slurry is emulsified, pasteurized, homogenized, and cooled. Various other solutions, mixtures, or other materials may be added to the resulting emulsion before, during, or after further processing. The resulting mixture is then heated and dried into powder form, which may be accomplished by spray drying or other heat-treating methods of forming solid particulates in a powder matrix. Other essential or optional materials may also be added to the formulation by dry blending, agglomerating, or otherwise combining the added material to the forming or just formed solid particulates.

Other suitable methods for making nutritional formulas are described, for example, in U.S. Pat. No. 6,365,218 (Borschel, et al.), U.S. Pat. No. 6,589,576 (Borschel, et al.), and U.S. Pat. No. 6,306,908 (Carlson, et al.), which descriptions are incorporated herein by reference.

EXAMPLES

The following examples further describe and demonstrate specific embodiments within the scope of the present invention. The examples are given solely for the purpose of illustration and are not to be construed as limitations of the present invention, as many variations thereof are possible without departing from the spirit and scope of the invention. All exemplified amounts are weight percentages based upon the total weight of the composition, unless otherwise specified.

Each of the exemplified formulas is fed to humans to provide daily nutrition. Each composition contains hydrolyzed casein protein and lecithin, as described herein, wherein each composition has improved oxidative stability and improved sensory performance.

Examples 1-4

These examples illustrate infant nutritional powder embodiments of the present invention, including a method of using and making the formula. Ingredients for each batch are listed in the following table.

| Ingredients | Example 1 Quantity per 45,359 kg (100,000 lbs) | Example 2 Quantity per 45,359 kg (100,000 lbs) | Example 3 Quantity per 45,359 kg (100,000 lbs) | Example 4 Quantity per 45,359 kg (100,000 lbs) |
|---|---|---|---|---|
| Lactose (kg) | 20461 | 20015 | 19887 | 19987 |
| Non Fat Dry Milk (kg) | 8495 | 9230 | 9414 | 9046 |
| High Oleic Safflower Oil (kg) | 5295 | 5295 | 5303 | 5256 |
| Soy Oil (kg) | 4023 | 4023 | 4029 | 3993 |
| Coconut Oil (kg) | 3705 | 3705 | 3711 | 3678 |
| Whey Protein Concentrate (kg) | 2397 | 2333 | 2188 | 2220 |
| Potassium Citrate (kg) | 413 | 416 | 422 | 421 |
| Casein Hydrolysate DH 6 (kg), | 296 | 0 | 0 | 0 |
| Casein Hydrolysate DH 23 (kg), | 0 | 59.2 | 0 | 0 |
| Casein Hydrolysate DH 45 (kg), | 0 | 0 | 144 | 0 |
| Casein Hydrolysate DH 80 (kg), | 0 | 0 | 0 | 262 |
| Calcium Carbonate (kg) | 183 | 184 | 185 | 185 |
| ARASCO Mortierella alpina Oil (kg) | 134 | 134 | 134 | 134 |
| Soy Lecithin (kg) | 115 | 115 | 57.5 | 259 |
| Nucleotide-Choline Premix (kg) | 107 | 107 | 107 | 107 |
| Potassium Chloride (kg) | 59.8 | 58.4 | 55.1 | 55.9 |
| Ascorbic Acid (kg) | 57.8 | 57.8 | 57.8 | 57.8 |
| Vit/Min/Premix (kg) | 50.6 | 50.6 | 50.6 | 50.6 |
| DHASCO *Crypthecodinium cohnii* Oil (kg) | 50.5 | 50.5 | 50.5 | 50.5 |
| Magnesium Chloride (kg) | 46.9 | 47.1 | 47.5 | 47.4 |
| Citric Acid (kg) | 26.1 | 26.1 | 26.1 | 26.1 |
| Sodium Chloride (kg) | 24.7 | 26.0 | 28.7 | 28.1 |
| Ferrous Sulfate (kg) | 20.6 | 20.6 | 20.6 | 20.6 |
| Choline Chloride (kg) | 19.6 | 19.6 | 19.6 | 19.6 |
| Vitamin A, D, E, K (kg) | 17.7 | 17.7 | 17.7 | 17.6 |
| Ascorbyl Palmitate (kg) | 5.04 | 5.04 | 5.05 | 5.00 |
| Mixed Tocopherols (70%) (kg) | 4.88 | 4.88 | 4.88 | 4.85 |
| L-Carnitine (kg) | 1.19 | 1.19 | 1.19 | 1.19 |
| Riboflavin (g) | 144 | 144 | 144 | 144 |

The exemplified formula may be prepared by making at least two separate slurries that are later blended together, heat treated, standardized, heat treated a second time, evaporated to remove water, and then spray dried.

Initially, a carbohydrate-mineral slurry is prepared by dissolving the carbohydrate (i.e., lactose) in water at about 60-71° C., followed by the addition of magnesium chloride, potassium chloride, potassium citrate, choline chloride, and sodium chloride. The resulting slurry is held under moderate agitation at about 49-60° C. until it is later blended with the other prepared slurries.

A protein-in-oil slurry is prepared by combining high oleic sunflower oil, soybean oil, and coconut oil at about 49-60° C., followed by the addition of ascorbyl palmitate, mixed tocopherols, soy lecithin, oil soluble vitamin premix, whey protein concentrate, casein hydrolysate, and calcium carbonate. The resulting oil slurry is held under moderate agitation at about 38-49° C. until it is later blended with the other prepared slurries.

Water, the carbohydrate-mineral slurry and the protein-in-oil slurry, are combined under adequate agitation. The pH of the resulting blend is adjusted with potassium hydroxide. This blend is held under moderate agitation at about 49-60° C. The ARA and DHA oil is added following the pH adjustment and prior to processing.

The resulting blend is heated to about 71-77° C., emulsified through a single stage homogenizer to a maximum of about 00 psig, and then heated to about 82-88° C., for about 5 seconds. The heated blend is passed through a flash cooler to reduce the temperature to about 77-82° C. and then passed through a plate cooler to further reduce the temperature to about 71-77° C. The cooled blend is then homogenized at about 2400-2600/400-600 psig, held at about 74-85° C. for about 16 seconds and then cooled to about 2-7° C. Samples are taken for microbiological and analytical testing. The mixture is held under agitation at about 2-7° C.

A water-soluble vitamin (WSV) solution and an ascorbic acid solution are prepared separately and added to the processed blended slurry. The vitamin solution is prepared by adding the following ingredients to water with agitation: potassium citrate, ferrous sulfate, WSV premix, L-carnitine, riboflavin, and nucleotide-choline premix. The ascorbic acid solution is prepared by adding potassium hydroxide and ascorbic acid to a sufficient amount of water to dissolve the ingredients. The ascorbic acid solution pH is then adjusted to about 5-9 with potassium hydroxide.

The blend pH may be adjusted to a pH range of about 6.65-6.85 with potassium hydroxide to achieve optimal product stability. The standardized blend then receives a second heat treatment. The blend is heated to about 66-82° C., and then further heated to about 118-124° C. for about 5 seconds. The heated blend is then passed through a flash cooler to reduce the temperature to about 71-82° C. Following heat treatment, the blend is evaporated down to a density of about 1.15-1.17 grams/milliliter.

The evaporated blend is passed through a spray drier, targeting a moisture level of about 2.5% in the finished powder.

mately 130° C. with an air-flow corresponding to 4.5 psi (40 Kpa). Each sample contains a base oil blend comprising, by weight of the base oil blend, approximately 40% high oleic safflower oil, 30% soy oil, 28% coconut oil, 0.37% mixed tocopherols, 0.026% ascorbyl palmitate, 0.13% oil soluble vitamin premix, 0.38% DHA oil, and 1.0% ARA oil. Ascorbic acid (ASC), citric add (CA), lecithin, tryptophan (TRP), hydrolyzed whey protein, hydrolyzed casein protein, and combinations thereof, are added to the base oil blend. Oil samples are agitated thoroughly to ensure a homogeneous sample prior to analysis. Samples are tested in duplicate, the results of which are summarized in the following table.

| ID | ASC | CA | Lecithin | TRP | *Hydrolyzed Whey Protein (DH 28) | *Hydrolyzed Casein Protein (DH 57) | OSI Result 1 | OSI Result 2 | Average OSI Results |
|---|---|---|---|---|---|---|---|---|---|
| A | — | — | 0.40% | — | — | 0.98% | 12.80 | 10.80 | 11.80 |
| B | — | — | 0.40% | 0.20% | — | — | 13.25 | 6.90 | 10.08 |
| C | — | 0.05% | — | — | — | 0.98% | 7.45 | 7.55 | 7.50 |
| D | 0.05% | — | 0.40% | — | — | — | 6.80 | 8.05 | 7.43 |
| E | 0.05% | — | — | 0.20% | — | — | 7.45 | 7.20 | 7.33 |
| F | — | — | — | — | 1.11% | 0.98% | 7.20 | 7.15 | 7.18 |
| G | — | 0.05% | — | 0.20% | — | — | 5.20 | 8.35 | 6.78 |
| H | — | — | — | 0.20% | — | 0.98% | 6.00 | 7.30 | 6.65 |
| I | — | — | 0.40% | — | 1.11% | — | 6.75 | 6.40 | 6.58 |
| J | 0.05% | — | — | — | — | 0.98% | 6.40 | 6.60 | 6.50 |
| K | — | — | — | 0.20% | 1.11% | — | 5.90 | 6.40 | 6.15 |
| L | 0.05% | — | — | — | 1.11% | — | 5.20 | 5.70 | 5.45 |
| M | 0.05% | 0.05% | — | — | — | — | 4.75 | 5.95 | 5.35 |
| N | — | 0.05% | — | — | 1.11% | — | 5.45 | 5.15 | 5.30 |
| O | — | 0.05% | 0.40% | — | — | — | 4.95 | 4.80 | 4.88 |
| P | — | — | — | — | — | — | 4.05 | 3.85 | 3.95 |

% represents the amount of ingredient as a percent by weight of the total OSI sample.
*The percentage, by weight, of protein in the total OSI sample is calculated to assimilate adding 2% hydrolyzed protein by weight of total protein in a nutritional powder to the oil blend of the nutritional powder.

The finished powder then undergoes agglomeration with water as the binder solution. The completed product is then packaged into suitable containers.

Study 1

A study is conducted to evaluate the antioxidant capability of several oil blends containing varying amounts/combinations of conventional (e.g., ascorbic acid, citric acid) and non-conventional nutritional powder antioxidants (e.g., lecithin, hydrolyzed casein protein, hydrolyzed whey protein). The batch variables are described below in the Study 1 results table.

Oxidative Stability Index (OSI)

The oxidative stability index (OSI) is a method for determining the ability of an oil to resist oxidation. Oil samples are exposed to heat and a constant flow of air. As the ability of the oil to resist oxidation is overcome, a rapid increase in the production of oxidation products (volatile organic acids) occurs. The organic acids are dissolved in a collection tube containing deionized water. The organic acids increase the conductivity of the water, as measured by an electrode. A plot is generated and an OSI value calculated for each sample, which correlates with the amount of time, in hours, the sample resisted excessive oxidation.

Five-gram oil samples are analyzed using an OSI instrument (Omnion Inc., Rockland, Mass., U.S.A.) at approxi- As shown in the above data table, the oil blend comprising 0.40% lecithin and 0.98% hydrolyzed casein protein (Sample A) was most effective, with an average OSI value of 11.80, in protecting against oxidation under the study conditions. Surprisingly, the combination of 0.40% lecithin and 0.98% hydrolyzed casein protein was more effective in protecting against oxidation than the oil blends comprising various combinations of more conventional antioxidants (i.e. ascorbic acid, citric acid).

Study 2

A study is conducted to evaluate the antioxidant capability of oil blends comprising lecithin, hydrolyzed casein protein, and combinations thereof. The batch variables are described below in the Study 2 results table.

The batch variables are tested according to the OSI method described in Study 1. The entire study is repeated on a separate day, so that Day 1 and Day 2 results are generated, which are summarized in the following table.

| Sample | Day | Lecithin | *Hydrolyzed Casein Protein (DH 57) | OSI Result 1 | OSI Result 2 | Average OSI Results | Expected **OSI Result |
|---|---|---|---|---|---|---|---|
| A | 1 | — | — | 1.55 | 3.65 | 2.60 | — |
| B | 1 | 1.0% | 0.99% | 16.70 | 12.25 | 14.48 | 7.4 |
| C | 1 | 0.4% | 0.99% | 11.80 | 9.65 | 10.73 | 6.4 |
| D | 1 | 1.0% | 0.49% | — | 10.40 | 10.4 | 6.5 |
| E | 1 | 0.4% | 0.49% | 6.85 | — | 6.85 | 5.5 |
| F | 1 | — | 0.99% | 4.10 | 3.95 | 4.03 | — |
| G | 1 | 1.0% | — | 3.15 | 3.60 | 3.38 | — |
| H | 1 | — | 0.49% | 3.10 | 3.15 | 3.13 | — |
| I | 1 | 0.4% | — | 2.45 | 2.30 | 2.38 | — |
| A | 2 | — | — | 2.30 | 2.35 | 2.33 | — |
| B | 2 | 1.0% | 0.99% | 23.80 | 18.00 | 20.9 | 10.8 |
| C | 2 | 0.4% | 0.99% | 20.45 | 21.15 | 20.8 | 8.7 |
| D | 2 | 1.0% | 0.49% | 15.60 | 10.50 | 13.05 | 9.9 |
| E | 2 | 0.4% | 0.49% | 10.85 | 13.10 | 11.98 | 7.8 |
| F | 2 | 1.0% | — | 5.50 | 6.20 | 5.85 | — |
| G | 2 | — | 0.99% | 4.70 | 5.15 | 4.93 | — |
| H | 2 | — | 0.49% | 3.55 | 4.55 | 4.05 | — |
| I | 2 | 0.4% | — | 3.70 | 3.85 | 3.78 | — |

% represents the amount of ingredient as a percent by weight of the total OSI sample.
*The percentage, by weight, of protein in the total OSI sample is calculated to assimilate adding either 1% or 2% of hydrolyzed protein by weight of the total protein in a nutritional powder to the oil blend of the nutritional powder.
***"Expected OSI Result" represents the summation of the "Average OSI Results" for each of the individual components (i.e., lecithin and hydrolyzed casein protein) in the oil blend sample. For example, the Expected OSI Result for the Day 1 oil blend sample (Sample B) comprising 1.0% lecithin and 0.99% hydrolyzed casein protein is 7.4,which is the sum of the Average OSI Result for: 1) the Day 1 oil blend sample (Sample G) comprising 1.0% lecithin (3.38); and 2) the Day 1 oil blend sample (Sample F) comprising 0.99% hydrolyzed casein protein (4.03).

As shown in the above data table, lecithin and hydrolyzed casein protein exhibit a synergistic antioxidant effect under the above-described conditions. Surprisingly, samples comprising lecithin in combination with hydrolyzed casein protein (Samples B, C, D, and E) are more effective in protecting against oxidation than expected, as the combination of lecithin and hydrolyzed casein protein provides greater protection against oxidation than the sum of the amount of protection provided, individually, by lecithin and hydrolyzed casein protein. For example, the Day 2 expected result for the oil blend comprising 0.40% lecithin and 0.99% hydrolyzed casein protein (Sample C) is 8.7; however, the actual average OSI result is 20.8. Surprisingly, the actual average OSI result is more than double that of the expected result, which is the sum of the oil blend comprising 0.40% lecithin (Sample I) and the oil blend comprising 0.99% hydrolyzed casein protein (Sample G).

Study 3

A study is conducted to evaluate the antioxidant capability of powdered nutritional formulations comprising lecithin, hydrolyzed casein protein, hydrolyzed whey protein, and combinations thereof.

Formulations are evaluated for oxidative stability in accordance with the methods described below. These include peroxide value (PV), sensory evaluation, oxidative stability index by NMR (OSI-NMR), and volatile organic compound (VOC) evaluation.

The nutritional powder formulas in the study are similar to commercially available SIMILAC® Advance Powder (Abbott Nutrition, a division of Abbott Laboratories, Columbus, Ohio, USA) except that the sample powders are modified to include hydrolyzed casein protein, hydrolyzed whey protein, lecithin, and combinations thereof according to the following table.

| Sample | Run Number | Lecithin % by wt. of total lipid | Hydrolyzed Casein Protein (DH 39) % by wt. of total protein | Hydrolyzed Whey Protein (DH 28) % by wt. of total protein |
|---|---|---|---|---|
| A | 1 | 0.4 | 0 | 0 |
| B | 2 | 1.2 | 4 | 0 |
| C | 3 | 1.2 | 0 | 4 |
| D | 3 | 0.4 | 0 | 0 |

The base formula used to prepare each test sample contains approximately (per 100 kcal): 2.07 grams protein (non fat dry milk, whey protein concentrate), 5.4 grams fat (high-oleic safflower, soy, coconut oils, arachidonic acid, docosahexaenoic acid), 10.8 grams carbohydrate (lactose), minerals (calcium 78 mg, phosphorus 42 mg, magnesium 6 mg, sodium 24 mg, potassium 105 mg, chloride 65 mg, iron 1.8 mg, zinc 0.75 mg, copper 0.09 mg, iodine 0.006 mg, manganese 5 µg, selenium 1.8 µg), and vitamins (vitamin A 300 IU, vitamin D 60 IU, vitamin E 1.5 IU, vitamin $K_1$ 8 µg, vitamin C 9 mg, thiamine 0.100 mg, riboflavin 0.150 mg, pyridoxine 0.060 mg, niacin 1050 mg, vitamin $B_{12}$ 0.25 µg, folic acid 15 µg, pantothenic acid 0.450 mg, biotin 4.4 µg, choline 16 mg, inositol 4.7 mg).

Preparation

Each nutritional powder study formula is batched, processed, and spray dried in a pilot plant facility. To prepare the study formulas, a base oil blend is prepared by combining high oleic sunflower oil, soybean oil, and coconut oil at about 49-60° C., followed by the addition of oil soluble vitamins, ascorbyl palmitate (374 ppm) and mixed tocopherols (375 ppm). The base oil blend is split into portions, and select levels of lecithin are added to each portion to make up distinct variables. The oil blend is added, under agitation at a temperature of about 49-60° C., to a slurry containing water, lactose, non-fat dry milk, and intact whey protein concentrate under agitation. Based on the study formula, hydrolyzed casein protein, hydrolyzed whey protein, and combinations thereof, are added to the resulting slurry. The resulting blend is high temperature short time (HTST) processed and homogenized at about 33% solids. The blends are standardized with vitamins and minerals, and evaporated to about 52% solids. The resulting product is then ultra high temperature (UHT) processed before feeding to the spray dryer. The powders are dried to a moisture content of about 2-3% by weight of the powder.

The spray-dried powders are packaged in cans with about a 0.5 inch (1.27 centimeter) headspace, with fill weights ranging from about 350 to about 390 grams. Lids are sealed onto the cans under normal atmospheric conditions, without modification to the headspace.

One week following manufacture, closed cans of the formulated samples are placed in elevated temperature storage, at about 37° C. and about 43° C. Following 2 weeks of incubation, the cans are opened and samples are pulled for testing. Between sampling, the cans are sealed with plastic commercial can overcaps and returned to elevated temperature storage. Following 5 weeks of elevated temperature storage, samples are pulled for testing.

Peroxide Value

Peroxides are primary products of lipid oxidation, and the measurement of their formation may be used to assess the ability of a nutritional powder to resist oxidation. The peroxide value method is based on the International Dairy Foundation (IDF) method for the determination of peroxide value (IDF Standard 74A:1991, International Dairy Foundation, June 1991), which measures peroxide levels by utilizing the oxidation of Fe II to Fe III by lipid/fatty acid hydroperoxides. Fe III complexes with reagent thiocyanate to form a red colored complex that is measured spectrophotometrically at 500 nanometers. The concentration of Fe III is then determined using a series of Fe III standard solutions and linear regression.

Each nutritional powder formula is evaluated following 5 weeks of elevated temperature storage. The formulas are first reconstituted in water. The lipid system of the reconstituted product is extracted, after the addition of methanol, by isooctane and then water for phase separation. After centrifugation, a quantitative aliquot of the clear isooctane extract is dried and then mixed with a 70% chloroform/30% by volume methanol solvent mixture, ammonium thiocyanate, and ferrous chloride under acidic conditions. The extracted lipid is then analyzed via the aforementioned IDF test method, the results of which are summarized in the following table.

| Run Number/ Sample Number | Lecithin % by wt. of total lipid | Hydrolyzed Casein Protein (DH 39) % by wt. of total protein | Hydrolyzed Whey Protein (DH 28) % by wt. of total protein | Peroxide Value) (mEq/kg oil 5 weeks 37° C. | 43° C. |
|---|---|---|---|---|---|
| 1/A | 0.4 | 0 | 0 | 14.7 | 17.3 |
| 2/B | 1.2 | 4 | 0 | 4.93 | 16.5 |
| 3/C | 1.2 | 0 | 4 | 2.92 | 11.1 |
| 3/D | 0.4 | 0 | 0 | 11.1 | 25 |

As shown in above data table, the nutritional powders comprising lecithin and hydrolyzed casein protein (Sample B) or lecithin and hydrolyzed whey protein (Sample C) are much more effective in resisting peroxide formation and thus oxidation than the nutritional powders comprising lecithin and no hydrolyzed proteins (Samples A and B) under the study conditions.

Sensory Evaluation

The sensory evaluation method provides an evaluation of oxidative stability by sensory detection of off-flavors and odors from compounds generated during the oxidation of oils. The sensory evaluation also provides an evaluation of the overall sensory performance of nutritional powders. Each nutritional powder formula is evaluated following 2 and 5 weeks of elevated temperature storage by a trained sensory panel. The nutritional powders are evaluated and then assigned a rating in accordance with the 5-point scale described in the following two tables.

| Rating | Oxidation | Sensory Oxidation Evaluation Ratings |
|---|---|---|
| 0 | None | No oxidized flavor notes detected |
| 1 | Very slight | Product has threshold to very slight intensity of oxidized flavor notes |
| 2 | Slight | Product has slight oxidized flavor notes |
| 3 | Moderate | Product has moderate to above intensity of oxidized flavor notes, but no "painty" notes detected |
| 4 | Much (rancid) | Product has threshold or above intensity of "painty" notes; may also have oxidized flavor notes at any intensity |
| 5 | Extreme (rancid) | Product has a moderate or above intensity of "painty" notes; may also have oxidized flavor notes at any intensity. |

| Rating | Sensory Fishiness Evaluation Ratings |
|---|---|
| 0 | No fishy |
| 1 | Very slight fishy (no degraded) |
| 2 | Slight fishy (no degraded) |
| 3 | Moderate or above intense slight fishy (no degraded) |
| 4 | Very slight to slight degraded fish |
| 5 | Moderate or above slight degraded fish |

The verbal descriptors assigned to each sensory evaluation have not been directly correlated to lipid oxidation, but are closely related to consumer acceptance.

The sensory results are summarized in the following table.

| Run Number/ Sample Number | Lecithin % by wt. of total lipid | Hydrolyzed Casein Protein (DH 39) % by wt. of total protein | Hydrolyzed Whey Protein (DH 28) % by wt. of total protein | 2 weeks 37° C. | 2 weeks 43° C. | 5 weeks 37° C. | 5 weeks 43° C. |
|---|---|---|---|---|---|---|---|
| | | | | Sensory Oxidation Off-Flavor Rating | | | |
| 1/A | 0.4 | 0 | 0 | 0 | 0 | 0 | 5 |
| 2/B | 1.2 | 4 | 0 | 0 | 0 | 0 | 4 |
| 3/C | 1.2 | 0 | 4 | 0 | 0 | 0 | 5 |
| 3/D | 0.4 | 0 | 0 | 0 | 4 | 0 | 5 |
| | | | | Sensory Fishiness Rating | | | |
| 1/A | 0.4 | 0 | 0 | 1 | 4 | 4 | 5 |
| 2/B | 1.2 | 4 | 0 | 0 | 0 | 0 | 0 |
| 3/C | 1.2 | 0 | 4 | 0 | 0 | 0 | 0 |
| 3/D | 0.4 | 0 | 0 | 1 | 2 | 2 | 1 |

As shown in the above data tables, the nutritional powders comprising lecithin and no hydrolyzed proteins (Samples A and D) displayed fishy notes and accelerated oxidation off-flavor development over the five-week test period. In contrast, the nutritional powders comprising lecithin and hydrolyzed casein protein (Sample B) or lecithin and hydrolyzed whey protein (Sample C) displayed no fishy notes or oxidation off-flavors at an elevated temperature of 37° C., no fishy notes at 43° C., and delayed oxidation off-flavors at 43° C.

The sensory data are consistent with the above-described peroxide value data, and show that a mixture of lecithin and hydrolyzed casein protein or a mixture of lecithin and hydrolyzed whey protein, as described herein, is able to protect powdered nutritional products better than lecithin alone under the above-described conditions.

Oxidative Stability Index (OSI) as Determined by Nuclear Magnetic Resonance (NMR) (OSI-NMR)

The oxidative stability index (OSI-NMR) is a method for determining the ability of a nutritional powder to resist oxidation. The OSI-NMR test method is similar to the published work of Hiroaki Saito and Kunisuke Nakamura (Nippon Suisan Gakkaishi, Vol. 55(9), 1663, (1989)) except that the Folch extraction method is modified to extract the lipids and fatty acid containing structures from the nutritional formula matrix.

LIPID EXTRACTION: To extract the lipid, each powder sample is mixed to minimize sample heterogeneity. Approximately 100 milligrams, within a variance of 2%, of each sample is weighed into glass screw-top centrifuge tubes. A 1 milliliter aliquot of methanol-$d_4$ is pipetted into each tube and then vortexed for one minute. Next, 2 milliliters of chloroform-d are added. The vials are then vortexed for 30 seconds. The solutions are maintained at room temperature for approximately 90 minutes and then are cold-centrifuged at 3,000 G for 10 minutes. The supernatant is then filtered through 0.2 millimeter PTFE syringe filters.

The extracted lipids are then analyzed via the aforementioned OSI-NMR test method. The regions of the NMR spectra used for integration are 1.1-2.6 ppm (aliphatic) and 2.7-2.9 ppm (diallyl) to produce an aliphatic/diallyl ratio.

Each nutritional powder formula is evaluated following 5 weeks of elevated temperature storage, the results of which are summarized in the following table.

| Run Number/ Sample Number | Lecithin % by wt. of total lipid | Hydrolyzed Casein Protein (DH 39) % by wt. of total protein | Hydrolyzed Whey Protein (DH 28) % by wt. of total protein | OSI-NMR Results (Aliphatic/ Diallyl Ratio) 5 weeks 43° C. |
|---|---|---|---|---|
| 1/A | 0.4 | 0 | 0 | 2.33 |
| 2/B | 1.2 | 4 | 0 | 1.30 |
| 3/C | 1.2 | 0 | 4 | 1.09 |
| 3/D | 0.4 | 0 | 0 | 1.72 |

As shown in the above data table, the nutritional powders comprising lecithin and hydrolyzed casein protein (Sample B) or lecithin and hydrolyzed whey protein (Sample C) have lower aliphatic/diallyl ratios and thus are more effective in protecting against oxidation than the nutritional powders comprising lecithin and no hydrolyzed proteins (Samples A and B) under the study conditions.

Volatile Organic Compounds (VOC) Evaluation

Volatile organic compounds (VOCs) are secondary products of lipid oxidation, and the measurement of their formation may be used to assess lipid oxidation. The VOC method involves the sampling of volatile organic compounds (VOCs), specifically hexanal, by heated headspace (HS) and the analysis of collected components by gas chromatography-mass spectrometry (GC-MS).

Each nutritional powder formula is evaluated following 2 and 5 weeks of elevated temperature storage. The formulas are reconstituted in water and stirred under vortex for 5 minutes. Then using a glass pipette, 1 gram of the reconstituted sample is placed into a 20 milliliter amber headspace vial that contains 4 milliliters of laboratory water and 2 grams of sodium chloride. The sample is then spiked with a total of 250 nanograms of internal standard (chlorobenzene-$d_5$), sealed with a polytetrafluoroethylene (PTFE) lined silicon septum, and vortexed for 30 seconds. Samples are then analyzed via HS GC-MS analysis. The HS GC-MS analysis is conducted using the following equipment and parameters.

Equipment

Headspace: EST Markelov HS9000, EST Analytical
   503 Commercial Drive, Fairfield, Ohio 45014
Trap: Supelco Vocarb 3000, Supelco
   595 North Harrison Road, Bellefonte, Pa. 16823

Interface: Agilent Volatiles Interface with EPC, Agilent Technologies
 2850 Centerville Road, Wilmington, Del. 19808
GC-MS: Agilent 6890N GC—Agilent 5975C MSD, Agilent Technologies
 2850 Centerville Road, Wilmington, Del. 19808
Software: ChemStation Revision E, NIST05 Mass Spectral Database
 Agilent Technologies, 2850 Centerville Road, Wilmington, Del., 19808
Column: HP-VOC 30 m×0.20 mm×1.12 µm, Agilent Technologies
 2850 Centerville Road, Wilmington, Del. 19808
Conditions
HS Conditions: Gas: helium
 Mode: absorbent trap (2N)
 Sample equilibration: 60° C. for 30 minutes
 Mixing: rotation on high
 Sampling: sweep vial contents onto trap at 40 milliliters/minute for 1 minute
 Dry purge: 40 milliliters/minute for 3 minutes at 30° C.
 Desorb: 260° C. for 1 minute
 Valve oven: 130° C.
 Transfer line: 150° C.
GC Conditions: Gas: helium
 Interface: 150° C.
 Mode: split
 Split ratio: 40:1
 Split flow: 40 milliliters/minute
 Column flow: 1.0 milliliters/minute
 Linear velocity: 36 centimeters/second
 Oven: 30° C. (10 minutes)-200° C. at 6° C./minute (7 minute hold)
MS Conditions: Transfer line: 200° C.
 Source: 230° C.
 Mode: full scan
 Scan range: 35-400 u.

The compounds (e.g., hexanal) detected during the HS GC-MS analysis are identified using the National Institute of Standards Mass Spectral Database. The areas (total ion counts) of the compounds detected and the area (total ion count) of the internal standard (ISTD) are used to calculate concentration according to the following equation:

$$\frac{\text{Area of Compound}}{\text{Area of } ISTD} \times \frac{\text{Total Amount } ISTD \text{ (nanograms)}}{\text{Sample Weight (grams)}} = \text{Concentration (parts per billion)}$$

The results of the HS GC-MS analysis are summarized in the following table.

As shown in the above data table, less hexanal (i.e., a VOC compound) is released from the nutritional powders comprising lecithin and hydrolyzed casein protein (Sample B) or lecithin and hydrolyzed whey protein (Sample C) as compared to the nutritional powders comprising lecithin and no hydrolyzed protein (Samples A and D) under the study conditions.

The VOC data are consistent with the above-described peroxide value, sensory, and OSI-NMR data and show that a mixture of lecithin and hydrolyzed casein protein or a mixture of lecithin and hydrolyzed whey protein, as described herein, are able to protect powdered nutritional products better than lecithin alone under the above-described conditions.

As shown in the above data tables for Study 3, lecithin in combination with hydrolyzed casein protein provides a greater than expected antioxidant effect in a nutritional powder matrix, which is consistent with the Study 1 and 2 OSI results that demonstrate the synergism of lecithin and hydrolyzed casein protein in an oil blend matrix as described hereinbefore.

SUMMARY

The collective data from the studies show that hydrolyzed casein protein in combination with lecithin, as described herein, provide a synergistic antioxidant effect in both an oil blend and nutritional powder matrix. The combination of hydrolyzed casein protein and lecithin, as described herein, is highly effective for protecting nutritional powders from oxidation and for providing better sensory performance over prolonged periods.

The results are surprising because lecithin and hydrolyzed casein protein are not conventional nutritional powder antioxidants. Lecithin, although generally known to have antioxidant properties, is not typically added to nutritional powders as an antioxidant. Lecithin is more typically added to nutritional liquids; however, lecithin is added to nutritional liquids for its functionality as an emulsifier, rather than as an antioxidant. Furthermore, hydrolyzed casein protein is typically added to nutritional powders to improve protein tolerance, not as an antioxidant. The data are especially surprising because not only are lecithin and hydrolyzed casein protein both non-conventional nutritional powder antioxidants; remarkably, the combination of the two ingredients provide a synergistic antioxidant effect in both oil blend and nutritional powder matrices.

What is claimed is:
1. A composition comprising:
  (a) carbohydrate;
  (b) lipid, comprising from about 0.25% to about 2.5% lecithin by weight of total lipid;

| Run Number/ Sample Number | Lecithin % by wt. of total lipid | Hydrolyzed Casein Protein (DH 39) % by wt. of total protein | Hydrolyzed Whey Protein (DH 28) % by wt. of total protein | VOC Results Hexanal Concentration (ppb) | | | |
|---|---|---|---|---|---|---|---|
| | | | | 2 weeks | | 5 weeks | |
| | | | | 37° C. | 43° C. | 37° C. | 43° C. |
| 1/A | 0.4 | 0 | 0 | 500 | 1486 | 3087 | 7281 |
| 2/B | 1.2 | 4 | 0 | 173 | 808 | 3121 | 6038 |
| 3/C | 1.2 | 0 | 4 | 138 | 699 | 2499 | 6762 |
| 3/D | 0.4 | 0 | 0 | 548 | 3000 | 8097 | 9721 |

(c) from about 0.5% to about 10% hydrolyzed casein protein by weight of total protein; and
(d) from about 90% to about 99.5% intact protein by weight of total protein;
wherein the composition is a nutritional powder.

2. The composition of claim 1, wherein the hydrolyzed casein protein has a degree of hydrolysis of between about 8% and about 90%.

3. The composition of claim 1, wherein the hydrolyzed casein protein has a degree of hydrolysis of between about 23% and about 80%.

4. The composition of claim 1, wherein the hydrolyzed casein protein has a degree of hydrolysis of between about 45% and about 80%.

5. The composition of claim 1, wherein the composition comprises from about 0.25% to about 1.0% of the lecithin by weight of total lipid.

6. The composition of claim 1, wherein the composition comprises from about 0.5% to about 5% of the hydrolyzed casein protein by weight of total protein.

7. A composition comprising:
(a) carbohydrate;
(b) lipid, comprising from about 0.25% to about 2.5% lecithin by weight of total lipid;
(c) from about 0.5% to about 10% hydrolyzed casein protein by weight of total protein; and
(d) from about 90% to about 99.5% intact protein by weight of total protein;
wherein the composition is an infant formula nutritional powder.

8. The composition of claim 7, wherein the hydrolyzed casein protein has a degree of hydrolysis of between about 8% and about 90%.

9. The composition of claim 7, wherein the hydrolyzed casein protein has a degree of hydrolysis of between about 23% and about 80%.

10. The composition of claim 7, wherein the hydrolyzed casein protein has a degree of hydrolysis of between about 45% and about 80%.

11. The composition of claim 7, wherein the composition comprises per 100 kcal from about 3 to about 8 grams of the lipid, from about 1 to about 6 grams of the protein, and from about 8 to about 16 grams of the carbohydrate.

12. The composition of claim 7, wherein the lipid comprises a long chain polyunsaturated fatty acid.

13. The composition of claim 12, wherein the polyunsaturated fatty acid comprises docosahexaenoic acid, eicosapentaenoic acid, arachidonic acid, or combinations thereof.

14. A composition comprising:
(a) carbohydrate;
(b) lipid, comprising from about 0.25% to about 1.5% lecithin by weight of total lipid;
(c) from about 0.5% to about 5% hydrolyzed casein protein by weight of total protein; and
(d) from about 95% to about 99.5% intact protein by weight of total protein;
wherein the composition is an infant formula nutritional powder.

15. The composition of claim 14, wherein the hydrolyzed casein protein has a degree of hydrolysis of between about 8% and about 90%.

16. The composition of claim 14, wherein the hydrolyzed casein protein has a degree of hydrolysis of between about 23% and about 80%.

17. The composition of claim 14, wherein the hydrolyzed casein protein has a degree of hydrolysis of between about 45% and about 80%.

18. The composition of claim 14, wherein the composition comprises per 100 kcal from about 3 to about 8 grams of the lipid, from about 1 to about 6 grams of the protein, and from about 8 to about 16 grams of the carbohydrate.

19. The composition of claim 14, wherein the lipid comprises a long chain polyunsaturated fatty acid.

20. The composition of claim 19, wherein the polyunsaturated fatty acid comprises docosahexaenoic acid, eicosapentaenoic acid, arachidonic acid, or combinations thereof.

* * * * *